Feb. 16, 1960 K. D. CURRY 2,925,125
TIRE TREAD CUTTING MACHINE
Filed Oct. 18, 1956 2 Sheets-Sheet 1

INVENTOR
KENNETH D. CURRY
BY
ATTORNEY

Feb. 16, 1960 K. D. CURRY 2,925,125
TIRE TREAD CUTTING MACHINE
Filed Oct. 18, 1956 2 Sheets-Sheet 2

INVENTOR
KENNETH D. CURRY
BY
ATTORNEY

United States Patent Office 2,925,125
Patented Feb. 16, 1960

2,925,125
TIRE TREAD CUTTING MACHINE
Kenneth D. Curry, Hattiesburg, Miss.

Application October 18, 1956, Serial No. 616,701

4 Claims. (Cl. 157—13)

This invention relates to apparatus for truing and balancing a tire mounted on a wheel. It relates particularly to an apparatus which will efficiently and accurately remove tread rubber from the high portions of a pneumatic automobile tire mounted on a wheel and inflated. Removal of such high portions on automobile tires will bring the tire accurately into circular contour thus eliminating vibration and uneven wear of the tire when the tire is used on an automobile.

Apparatus for this general purpose has heretofore been proposed but due to the arrangement of the apparatus, non-uniform speeds of the periphery of the tire and inaccurate cutting of the high portions of the tire were obtained.

It is an object of the present invention to provide a simple apparatus to efficiently and accurately remove tread rubber from the high portions or "bumps" of an inflated automobile tire mounted on a wheel.

Another object is to provide an apparatus which imparts uniform surface speeds to the tire during the cutting operation irrespective of the diameter of the tire.

An additional object is to provide an apparatus in which the pattern of the tire curvature formed into a curved template is immediately adjacent to the tire surface during the cutting operation to provide uniform cutting of the tire surface at all times.

A further object is to provide an apparatus which includes a cutter head which accurately follows the curvature of the tire without deviation of the angle of the cutter with respect to the periphery of the tire during the cutting operations in order to give an accurate cross sectional contour.

Additional objects and advantages are inherent in the apparatus which is designed for efficiency, accuracy and low cost in manufacture, and such objects and advantages will become clear upon use of the apparatus on tires which need removal of high spots or portions of the tread surface.

The above objects and advantages will become evident from reading the following description of the apparatus and operation thereof when taken with the accompanying drawings forming a part hereof. In the drawings, like numerals refer to corresponding parts in all views of the drawings and throughout the description.

Figure 2:
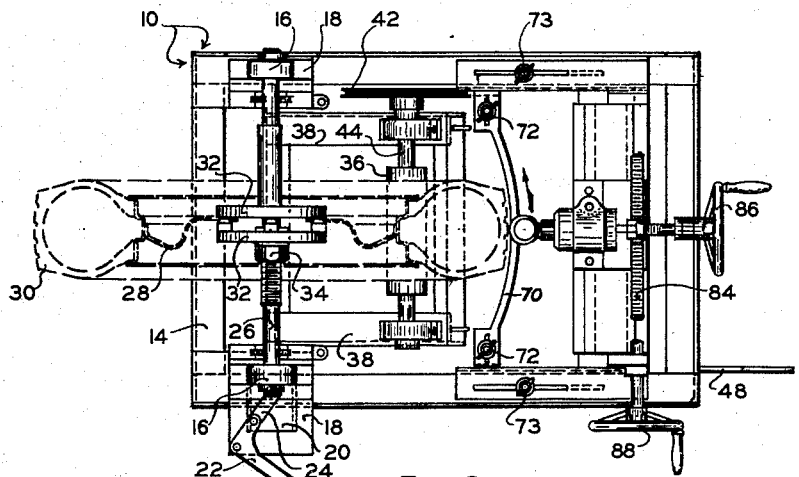
Figure 2 is a top view of the machine.

Referring more particularly to the drawings, a base or frame 10, which includes angular structural bars 12 arranged to form rectangular shaped side walls held in position by cross members 14, is provided to support a wheel, tire, cutting element and other parts of the apparatus. Suitable antifriction bearings 16 mounted on brackets 18, which are secured to the frame 10, are provided at the upper portion of the rectangular shaped side walls. One of the bearings 16 is preferably mounted on an adjustable bracket so as to provide limited movement for the bearing during mounting of a wheel into position. In the drawing, a bracket is shown provided with movable keyed parts 20 which may be moved a limited distance through movement of handle 22 which is secured to the movable portion of the bracket through linkage 24. A shaft 26 mounted on bearings 16 extends between the rectangular shaped side walls of the base 10.

A wheel 28 with its surrounding casing or tire 30 is mounted on shaft 26 by being clamped between discs 32 and held in fixed position on shaft 26 by nut 34.

Rotative movement is imparted to wheel 28 and tire 30 by means of friction roller 36 mounted on bracket 38 which is pivoted on a bearing 40 mounted in the lower portion of frame 10. A motor 41 mounted on bracket 38 rotates pulley 42 and friction roll 36 mounted on shaft 44. Coil spring 46 which has one end anchored to bracket 18 and the other end to pivoted bracket 38 pulls friction roller 36 into contact with the tread surface or periphery of tire 30. Operating handle 48 pivotally anchored at one end to frame 10 and contacting roller 50 mounted on the side of bracket 38 permits movement of friction roller 36 toward and away from the peripheral surface of tire 30. Latching catch 52 mounted on frame 10 enables friction roller 36 to be locked in a position out of contact with tire 30. Friction roller 36 preferably has a knurled surface to impart rotative movement to tire 30, although any other type of friction surface may be used thereon.

Mounted on the upper portion of frame 10, positioned between the rectangular shaped sides thereof, and immediately adjacent to the peripheral surface of tire 30 is a cutting device 54, which will now be described in more detail. The high portions of the tire tread are removed by means of a cylindrical cup shaped rotary cutter 56 having an annular shaped cutting edge 58. The cutter 56 is axially mounted on the extremity of a rotatable flexible cable 60, moving in casing 61, by means of a mounting bolt 62. Suitable ball bearings 64 and roller bearing 66 are provided to reduce wearing action on the moving parts of the cutter head of the cutting device 54. The cutter head is forced through the action of coil spring 68 against the side of curved template 70 which is adjustably mounted between the side walls of base 10 on brackets 72. Coil-spring 68 is mounted within a telescopic housing 74 secured to the cutter head through set screws 76. The pressure which spring 68 imparts to the cutter head may be regulated by means of adjusting screw 78 threaded into the telescopic housing 74. The telescopic housing 74 is mounted on the dove-tailed cross head 80 which may be moved toward and away from the tire by means of translating screw 82 and across the surface of the tire by means of translating screw 84. Screw 82 may be operated by turning operating wheel 86, and screw 84 may be operated by turning operating wheel 88. As hand wheel 88 is turned, screw 84 will move the cutting device 54 between the side walls of base 10, and during such movement coil spring 68 will force the cutter head against the curved template 70 and the cutter head will thus follow accurately the curvature of the template 70. The templates 70 will vary in curvature dependent upon the cross sectional contour of the tread surface of the itre.

Cutter 56 is rotated by means of motor 90 and flexible shaft 60.

The speed of the motor 90 is generally about 1800 r.p.m. for satisfactory cutting results, although such speed may be varied. The speed of the tire 30 operated through friction roll 36 is about 350 to 400 r.p.m. for good results, but such speeds may likewise be varied. It will be obvious that since rotative motion is imparted to tire 30 through friction roll 36 at the periphery of the tire, the rotation speed of the tire will remain about the same in all cases irrespective of the size of the tire.

Figure 1:
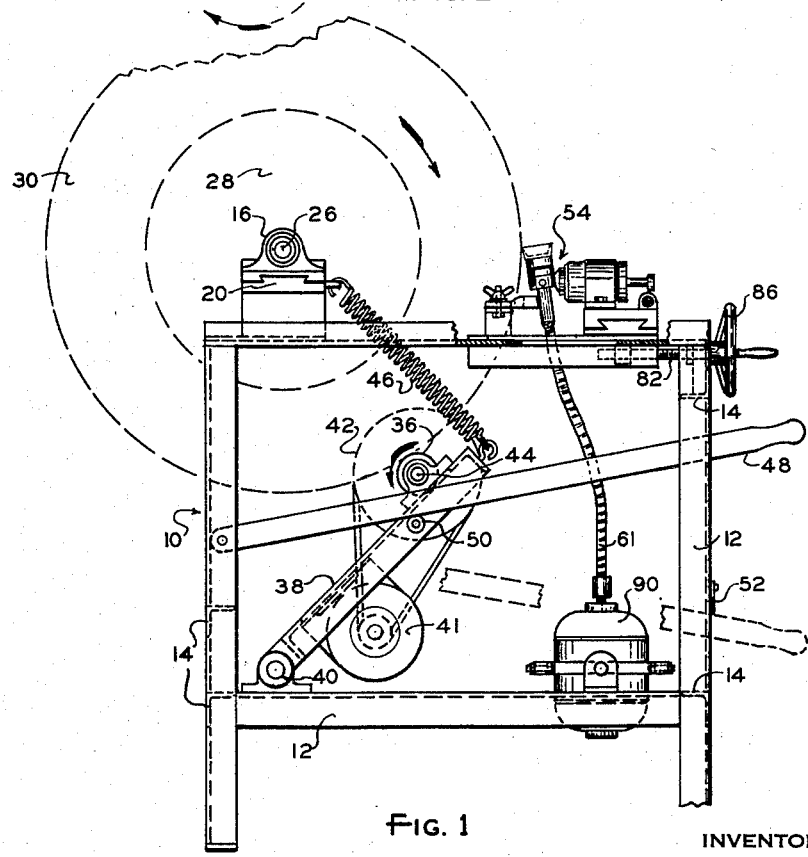
Figure 1 is a side elevation of the improved tire balancing machine embodying the main features of the present invention.
Figure 3:
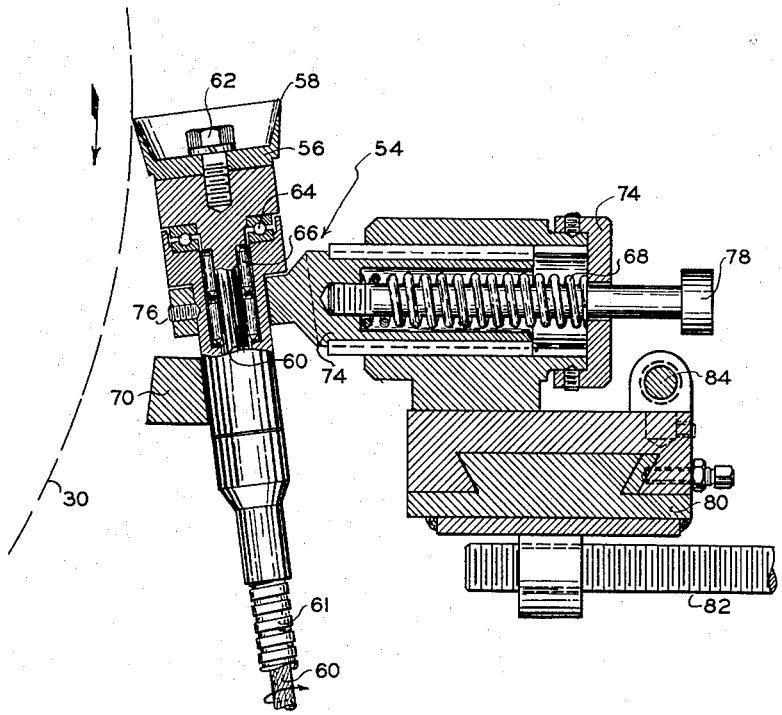
Figure 3 is an enlarged view in section of the cutter, template and tire which are also shown in Figures 1 and 2.

In operation, tire 30 mounted on wheel 28 is bolted in position on shaft 26. Shaft 26 is placed in position on bearings 16. Template 70 is then moved adjacent to the tire tread surface as shown in Figure 2 by adjusting brackets 72 and butterfly nuts 73. The cutter device 54 is moved toward the tire surface by operating translating screw 82 until the cutter head rests firmly against the side of the curved template 70. Positive pressure is then imparted to spring 68 by adjusting screw 78. As tire 30 is rotated through the medium of motor 41, and the rotating cutter 56 moves across the surface of the tire, the high spots on the tire are removed. The operation for accurately removing the high spots is accomplished by properly manipulating the translating screws 82 and 84 by means of operating wheels 86 and 88 respectively. When the tire 30 has been cut until a uniform tread surface has been obtained, the cutter head is retracted, and the rotation of the tire is stopped by forcing handle 48 downwardly into the dotted position shown in Figure 1.

While I have shown and described embodiments of my invention, it is to be understood that they are illustrative only, and my invention is limited only by the appended claims.

I claim:

1. In an apparatus for truing tires which comprises a frame means for rotatably mounting a tire on said frame, a template mounted on said frame at a place offset from the tire mounting means, a cutter mounted on a cutter carrier movably mounted on said frame in position to engage the tread of said tire, said template being positioned between the tire mounting means and the cutter carrier, means for traversing the cutter carrier in a direction generally parallel to the tire mounting axis, and means on the cutter carrier for resiliently urging the cutter against the template as the cutter carrier is so traversed.

2. In apparatus for truing tires as defined in claim 1, and wherein said template is positioned adjacent to the tread surface of the tire and is shaped to conform to the curvature of said tread surface.

3. In apparatus for truing tires as defined in claim 1, and wherein the means on the cutter carrier includes a coil spring mounted in a telescopic housing, said spring resiliently urging the cutter against the template.

4. In an apparatus as defined in claim 3, and wherein said template is positioned adjacent to the tread surface of the tire and is shaped to conform to the curvature of said tread surface.

References Cited in the file of this patent
UNITED STATES PATENTS

| Number | Name | Date |
|---|---|---|
| 18,428 | Walsh | Oct. 13, 1857 |
| 172,480 | Piat | Jan. 18, 1876 |
| 392,036 | Johnston | Oct. 30, 1888 |
| 400,882 | Tower | Apr. 2, 1889 |
| 519,820 | Reinecker | May 15, 1894 |
| 944,002 | Smith et al. | Dec. 21, 1909 |
| 1,166,126 | Gridley | Dec. 28, 1915 |
| 1,206,528 | Goddu | Nov. 28, 1916 |
| 1,289,674 | Coradi | Dec. 31, 1918 |
| 1,429,617 | Muller | Sept. 19, 1922 |
| 1,851,555 | Wheeler | Mar. 29, 1932 |
| 1,891,789 | Wheeler | Dec. 20, 1932 |
| 2,009,524 | Schmidt | July 30, 1935 |
| 2,132,835 | Stevens | Oct. 11, 1938 |
| 2,200,575 | Haskins | May 14, 1940 |
| 2,321,936 | Pollock | June 15, 1943 |
| 2,333,599 | Terry | Nov. 2, 1943 |
| 2,601,810 | James | July 1, 1952 |
| 2,606,612 | Dinnan | Aug. 12, 1952 |
| 2,651,893 | Braley | Sept. 15, 1953 |
| 2,713,283 | Lomazzo | July 19, 1955 |
| 2,765,845 | Bullis | Oct. 9, 1956 |